US010090550B2

(12) United States Patent
Cho et al.

(10) Patent No.: US 10,090,550 B2
(45) Date of Patent: Oct. 2, 2018

(54) REDOX FLOW BATTERY

(71) Applicant: STANDARD ENERGY Co., Ltd., Daejeon (KR)

(72) Inventors: Bumhee Cho, Daejeon (KR); Bugi Kim, Daejeon (KR); Kihyun Kim, Daejeon (KR); Damdam Choi, Daejeon (KR); Wontae Kim, Daejeon (KR); Sujeong Lee, Daejeon (KR); Dayoung Kim, Daejeon (KR)

(73) Assignee: STANDARD ENERGY CO., LTD., Daejeon (KR)

( * ) Notice: Subject to any disclaimer, the term of this patent is extended or adjusted under 35 U.S.C. 154(b) by 32 days.

(21) Appl. No.: 15/391,377

(22) Filed: Dec. 27, 2016

(65) Prior Publication Data

US 2017/0301943 A1 Oct. 19, 2017

(30) Foreign Application Priority Data

Apr. 15, 2016 (KR) ........................ 10-2016-0046433

(51) Int. Cl.
*H02J 7/00* (2006.01)
*H01M 8/18* (2006.01)
*H01M 8/0258* (2016.01)
*H01M 8/023* (2016.01)
*H01M 8/0273* (2016.01)
*H01M 8/0204* (2016.01)

(52) U.S. Cl.
CPC ........... *H01M 8/188* (2013.01); *H01M 8/023* (2013.01); *H01M 8/0204* (2013.01); *H01M 8/0258* (2013.01); *H01M 8/0273* (2013.01); *H02J 7/0068* (2013.01); *H01M 2220/10* (2013.01)

(58) Field of Classification Search
CPC .... H01M 8/188; H01M 8/0204; H01M 8/023; H01M 8/0258; H01M 8/0273; H01M 2220/10; H02J 7/0068
USPC ........................................... 320/128
See application file for complete search history.

(56) References Cited

U.S. PATENT DOCUMENTS

2017/0194660 A1* 7/2017 Ikeuchi ............ H01M 8/04201
2017/0294662 A1* 10/2017 Madden ............ H01M 8/0258
2017/0324108 A1* 11/2017 Yamaguchi ........... H01M 8/188

FOREIGN PATENT DOCUMENTS

| JP | 5-326007 A | 12/1993 |
| JP | 7-192749 A | 7/1995 |
| JP | 2006-40591 A | 2/2006 |
| JP | 2015-156266 A | 8/2015 |
| KR | 10-1241532 B1 | 3/2013 |
| KR | 10-2014-0015433 A | 2/2014 |
| KR | 10-1470735 B1 | 12/2014 |
| KR | 10-2015-0064516 A | 6/2015 |

(Continued)

OTHER PUBLICATIONS

Japanese Decision to Grant for Appl. No. 2016-257292 dated Mar. 6, 2018 (w/ English translation).

(Continued)

*Primary Examiner* — Nathaniel Pelton
(74) *Attorney, Agent, or Firm* — Birch, Stewart, Kolasch & Birch, LLP

(57) ABSTRACT

A redox flow battery. The redox flow battery has a plurality of cells stacked on each other and three or more conductive terminals. The redox flow battery is able to vary a charge voltage and a discharge voltage by switching control.

6 Claims, 10 Drawing Sheets

(56) References Cited

FOREIGN PATENT DOCUMENTS

| | | |
|---|---|---|
| KR | 10-1560202 B1 | 10/2015 |
| KR | 10-1586349 B1 | 1/2016 |
| KR | 10-1609907 B1 | 4/2016 |
| KR | 10-1655292 B1 | 9/2016 |
| WO | WO 03/005476 A1 | 1/2003 |
| WO | WO 2015/163367 A1 | 10/2015 |
| WO | 2017-134938 A | 8/2017 |

OTHER PUBLICATIONS

Japanese Office Action for Appl. No. 2016-257292 dated Oct. 31, 2017 (w/ English translation).

* cited by examiner

REDOX FLOW BATTERY

BACKGROUND OF THE INVENTION

Field of the Invention

The present invention relates generally to a redox flow battery. More particularly, the present invention to a redox flow battery having a plurality of cells stacked on each other and three or more conductive terminals, the redox flow battery being able to vary a charge voltage and a discharge voltage by switching control.

Description of the Related Art

Recently, while the development of energy storage systems (ESSs) has been actively undertaken, secondary batteries that can be charged and discharged many times have come to prominence.

Energy storage systems are systems for storing electric power produced by thermal power generation, hydraulic power generation, solar power generation, wind power generation, tidal power generation, combined heat and power generation, or the like to supply stored electric power to apparatuses or systems that require electric power. In this regard, energy storage systems are categorized into storage systems using batteries, such as a LiB battery, a NaS battery, a flow battery (FB), or a super capacitor, and storage systems without batteries.

Such a flow battery contains electrolyte solutions including an electroactive material therein, in which chemical energy is converted into electrical energy in response to the electrolyte solutions flowing through an electrochemical reactor. The term "electroactive material" used herein refers to a material included in the electrolyte solutions to participate in an electrode reaction or be absorbed to electrodes.

More specifically, the flow battery is configured such that ion exchange occurs through a membrane while a positive-pole electrolyte and a negative-pole electrolyte are circulating on both sides of the membrane. Ion exchange drives electrons to migrate, whereby charging and discharging are provided.

The flow battery as described above is known to be most suitable for an energy storage system, since the longevity thereof is longer than that of existing secondary batteries and the flow battery can be fabricated into a medium or large system having a capacity of kWs to MWs.

The flow battery can be rapidly recharged by replacing the electrolyte solutions (as in the case in which the fuel tank of an internal combustion engine is filled with gasoline), and collected electrolyte solutions can be recharged and reused.

The flow battery has specific advantages, such as a freely variable structure thereof, long operating life, and clean operation.

Specific flow batteries have other advantages, such as ability to measure the state of charge in a simple manner, low maintenance cost, and resistance to overcharge/over-discharge.

As an energy storage system, a redox flow battery has come to prominence. The redox flow battery is a type of secondary battery able to circulate reactants therein to increase the capacity of the battery.

The redox flow battery is named by synthesizing the terms: reduction, oxidation, and flow. The redox flow battery stores electrolyte solutions in tanks and pumps electrolyte solutions to portions referred to cells to provide charging and discharging.

In the structure of the redox flow battery comprised of a stack of a plurality of cells, conventionally, conductive terminals have been only provided on opposite ends. When the redox flow battery is connected to a variable system, the charging and discharging efficiency of the battery are lowered, due to the density of electricity of charging and discharging energy decreasing over time.

Korean Patent No. 10-1241532 disclosed a battery charging apparatus for adaptively varying a charge voltage and a battery charge controlling method thereof.

The information disclosed in the Background of the Invention section is only for the enhancement of understanding of the background of the invention, and should not be taken as an acknowledgment or as any form of suggestion that this information forms a prior art that would already be known to a person skilled in the art.

RELATED ART DOCUMENT

Patent Document 1: Korean Patent No. 10-1241532 (registered on Mar. 4, 2013)

SUMMARY OF THE INVENTION

Accordingly, the present invention has been made keeping in mind the above problems occurring in the related art, and the present invention is intended to propose a redox flow battery having a plurality of cells stacked on each other and three or more conductive terminals, the redox flow battery being able to vary a charge voltage and a discharge voltage by switching control.

The technical solutions of the present invention are not limited to the foregoing solutions, and other solutions that have not been stated will be apparent to a person skilled in the art from the following description.

In order to achieve the above object, according to one aspect of the present invention, there is provided a redox flow battery having electrolyte solutions stored in a tank and circulating the electrolyte solutions through insides of cells. The redox flow battery may include a cell or a stack of a plurality of cells. The cell includes: a separator membrane allowing ions transferred to both surfaces thereof from a positive-pole electrolyte and a negative-pole electrolyte to pass therethrough; first and second path frames stacked on both surfaces of the separator membrane, the first and second path frames having paths through which the positive-pole electrolyte and the negative-pole electrolyte pass, respectively; and separator plates stacked on outer surfaces of the path frames, the separator plates allowing electric charges to pass therethrough. The redox flow battery may include three or more collector plates formed of a conductive material and stacked on outer surfaces of outermost cells among the plurality of cells and between two adjacent cells among the plurality of cells. The redox flow battery may include a first circulation path extending through a first fixed frame disposed on one side and the first path frame and returns to the first fixed frame, such that the positive-pole electrolyte enters through the first fixed frame, flows through the first path frame, and exits through the first fixed frame, and a second circulation path extending through a second fixed frame disposed on the other side and the second path frame and returns to the second fixed frame, such that the negative-pole electrolyte enters through the second fixed frame, flows through the second path frame, and exits through the second fixed frame. The redox flow battery may include: a charging circuit supplying charging electric power to the cells; a discharging circuit providing discharging electric power from the cells to an external load; a switching circuit switching electrical connection between the cells and the charging circuit and electrical connection between the cells and the discharging circuit; and a controller controlling the switching circuit by discriminating specific cells among the cells used in charging and specific cells among the cells used in discharging.

Here, the switching circuit may include a plurality of switches to selectively provide electrical connection between the cells using series connection, parallel connection, or series-and-parallel combined connection.

The controller may control the switching circuit such that specific cells among the cells connected to the charging circuit differ from specific cells among the cells connected to the discharging circuit.

The redox flow battery may simultaneously provide charging and discharging.

The controller may control the switching circuit based on charging electric power supplied through the charging circuit.

The controller may control the switching circuit based on discharging electric power that is to be supplied to an external load through the discharging circuit.

In the redox flow battery according to an exemplary embodiment of the present invention, outer circuit-connecting terminals are formed on three or more #collector plates among a plurality of plates, respectively, such that charging and discharging can be varied.

In addition, the connection between cells is embodied using series connection or series-and-parallel combined connection.

Furthermore, the circuits can be stabilized by differently switching the cells connected to the charging circuit and the cells connected to the discharging circuit.

In addition, charging and discharging can be simultaneously performed by adjusting the electrical connection of the cells used in charging and the electrical connection of the cells used in discharging, in which a charge voltage and a discharge voltage can be controlled differently.

Furthermore, the efficiency of charging can be improved by adjusting the number of cells connected in series usable in charging depending on a charge voltage.

In addition, an output level can be set (e.g. varied) depending on the intention of a user.

Furthermore, since the cells share electrolyte solutions, charging and discharging can be simultaneously performed, and a charge voltage and a discharge voltage can be controlled differently.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
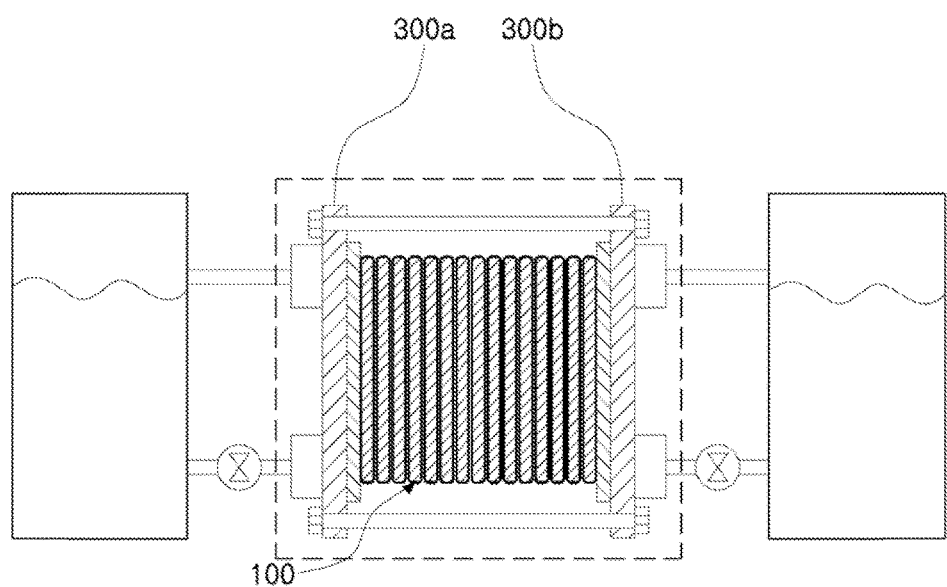
FIG. 1 is a conceptual view illustrating a redox flow battery according to an exemplary embodiment of the present invention.

The present invention will now be described in detail based on aspects (or embodiments). The present invention may, however, be embodied in many different forms and should not be construed as being limited to only the embodiments set forth herein, but should be construed as covering modifications, equivalents or alternatives falling within ideas and technical scopes of the present invention.

It will be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, the present invention will be described in greater detail with reference to the accompanying drawings. Prior to offering the description, it is to be noted that terms or words expressed in the specification and claims should not be limited to or construed by their conventional or dictionary meanings, but should be understood as meanings and concepts conforming with the technical spirits of the present invention because the inventor can properly define the concepts of terms or words used in order to clarify his/her invention in the best manner. Unless otherwise defined in the technical spirits and dictionary terms used, the terms or words expressed in the specification and claims should be understood as meanings and concepts conforming with meanings understood by a person skilled in the art to which the present invention relates. In the following description, detailed descriptions of known functions and components incorporated herein will be omitted in the case that the subject matter of the present invention is rendered unclear. The following drawings are provided as examples to fully convey the principle of the present invention to a person skilled in the art. Therefore, the present invention may be embodied in many different forms without being limited to the illustration of the following drawings. Throughout this document, reference should be made to the drawings, in which the same reference numerals and symbols will be used to designate the same or like components.

Figure 2:
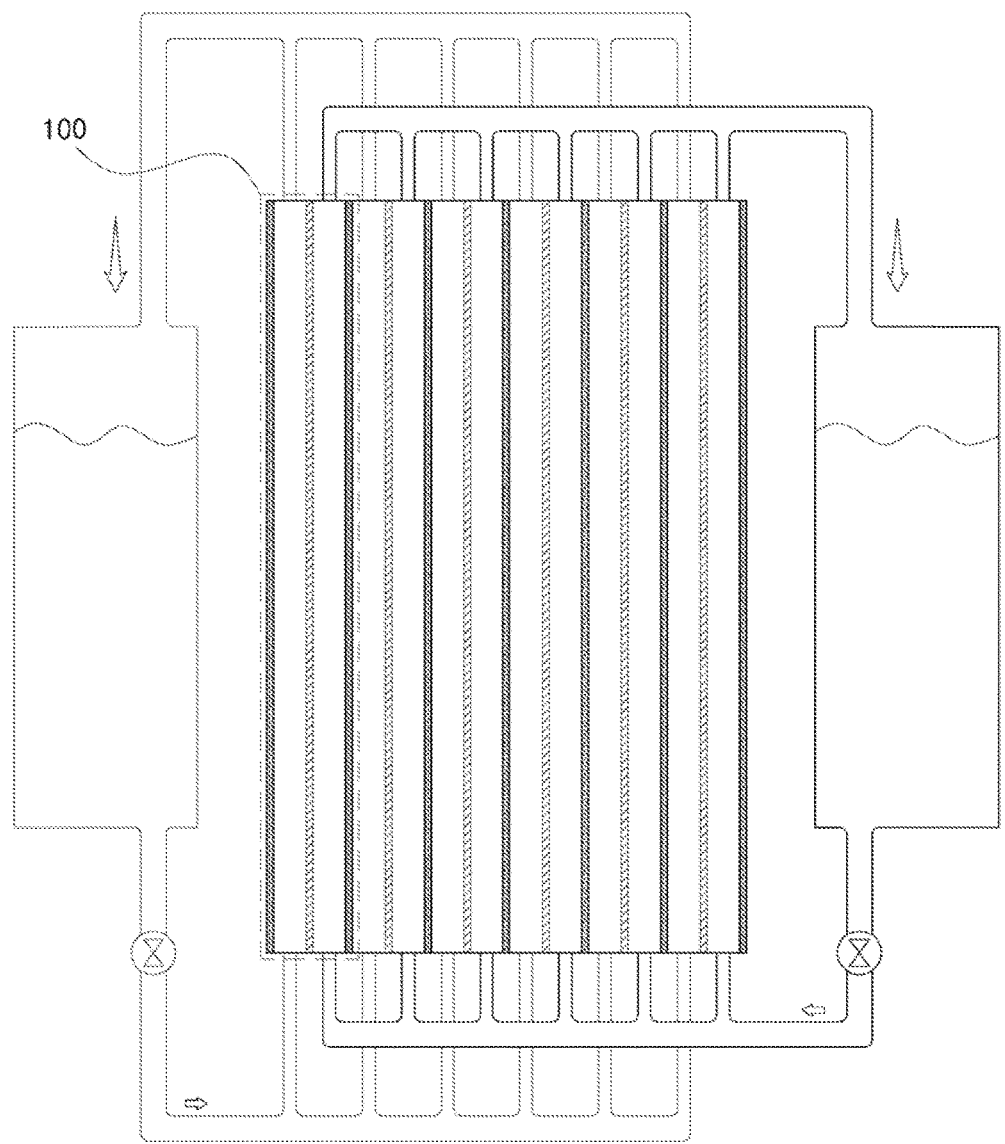
FIG. 2 is a conceptual view illustrating paths along which a positive-pole electrolyte and a negative-pole electrolyte circulate in the redox flow battery according to the exemplary embodiment of the present invention.
Figure 3:
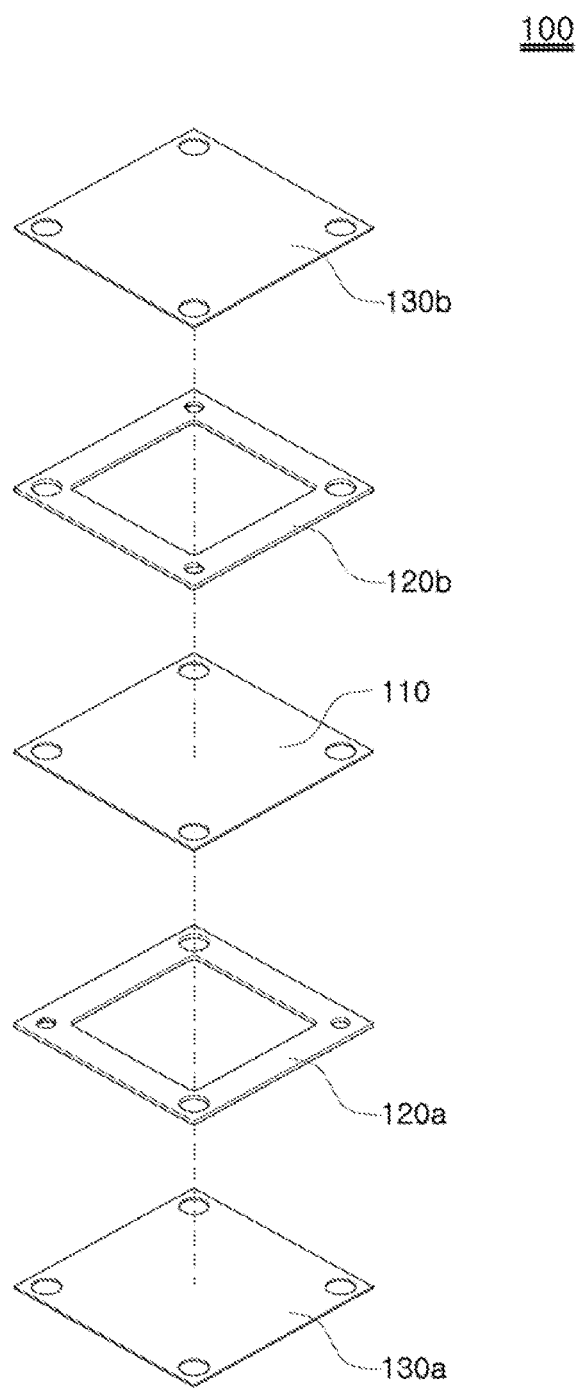
FIG. 3 is an exploded perspective view illustrating the components of the cell of the redox flow battery according to the exemplary embodiment of the present invention.
Figure 4:
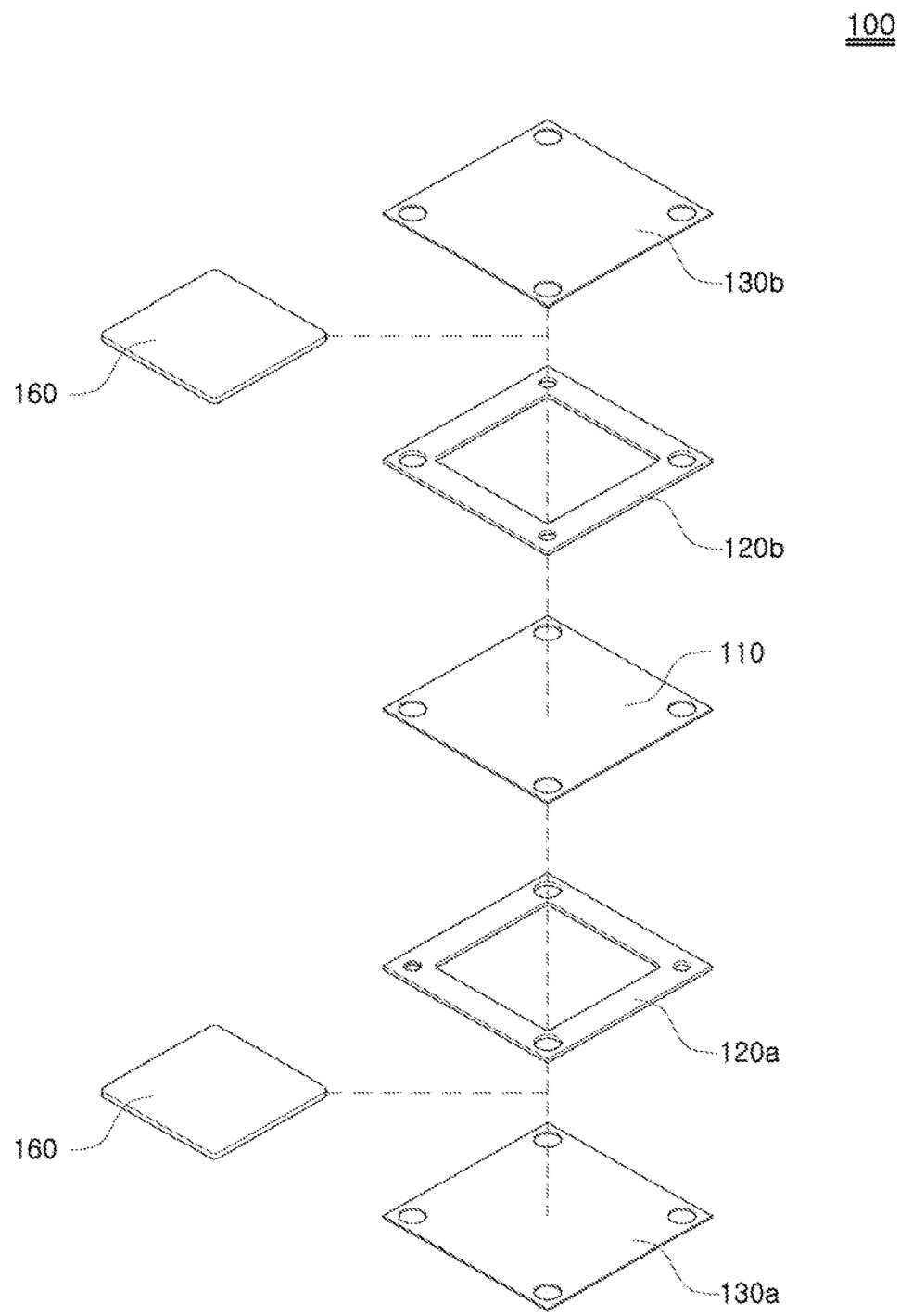
FIG. 4 is an exploded perspective view illustrating an assembly in which impregnation members are added to the structure illustrated in FIG. 3.
Figure 5:
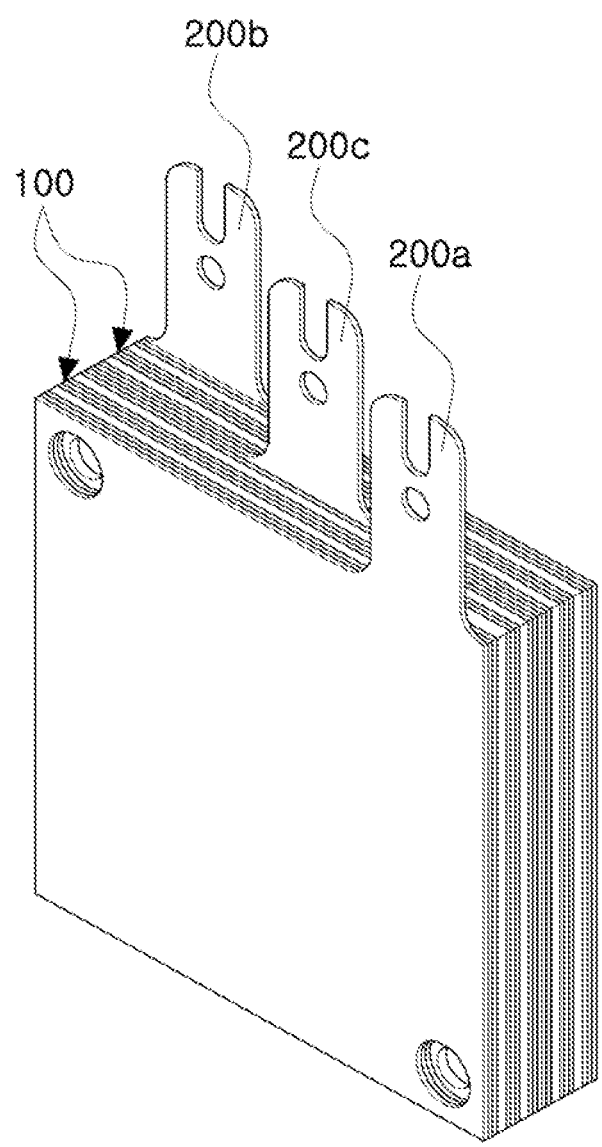
FIG. 5 is an assembly view illustrating an example in which outermost cells are attached to fixed frames in the redox flow battery according to the exemplary embodiment of the present invention.
Figure 6:
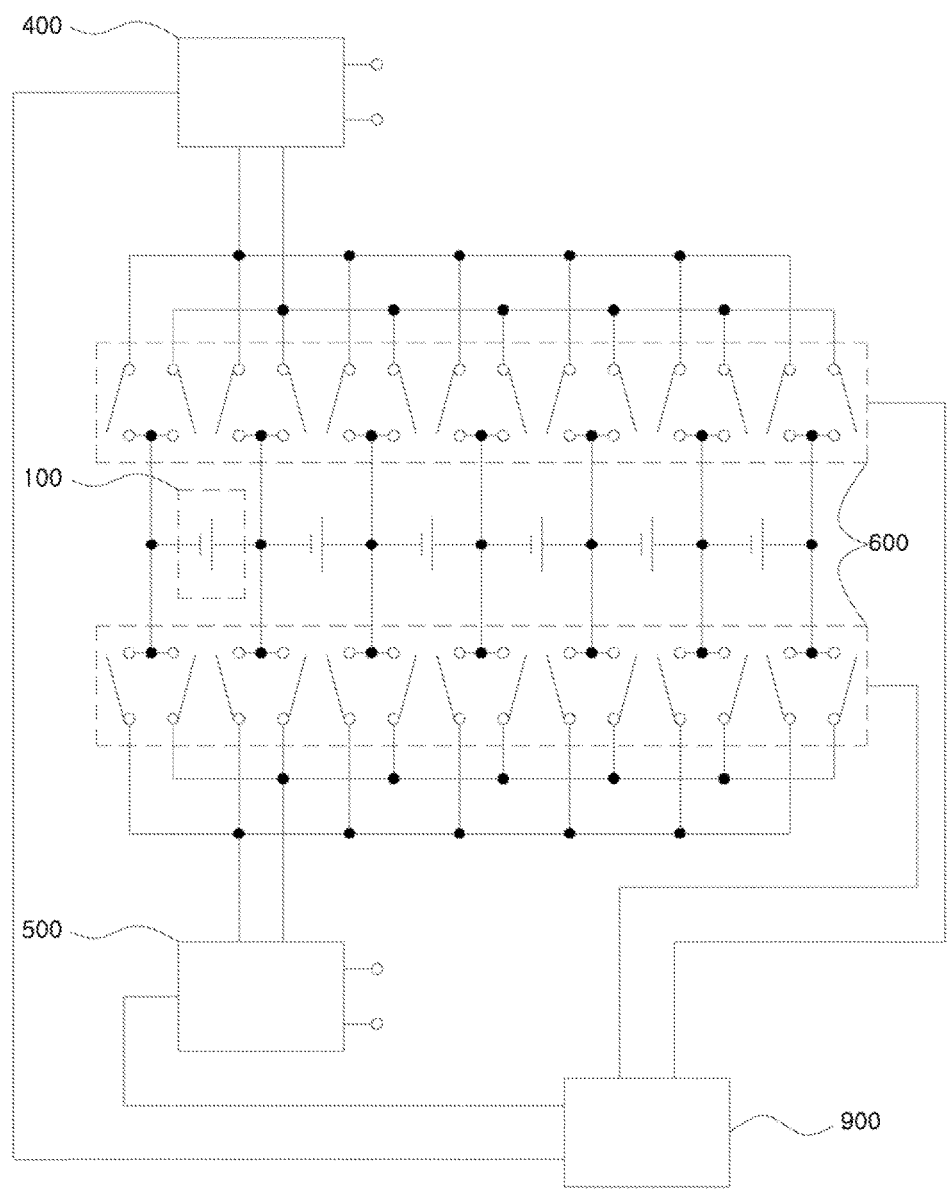
FIG. 6 is a flow diagram illustrating the redox flow battery according to the exemplary embodiment of the present invention.
Figure 7:
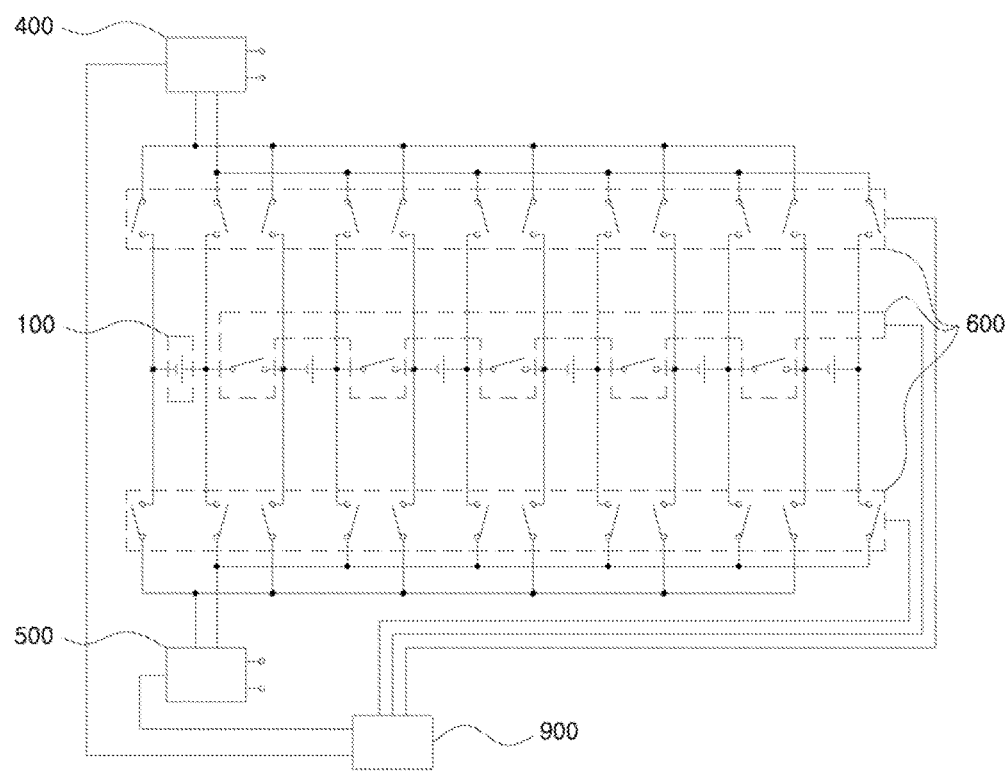
FIG. 7 is a circuit diagram illustrating an example of the redox flow battery according to the exemplary embodiment of the present invention in which a plurality of switches are provided such that the electrical connection between the cells is selectively embodied using series connection, parallel connection, or series-and-parallel combined connection.
Figure 8:
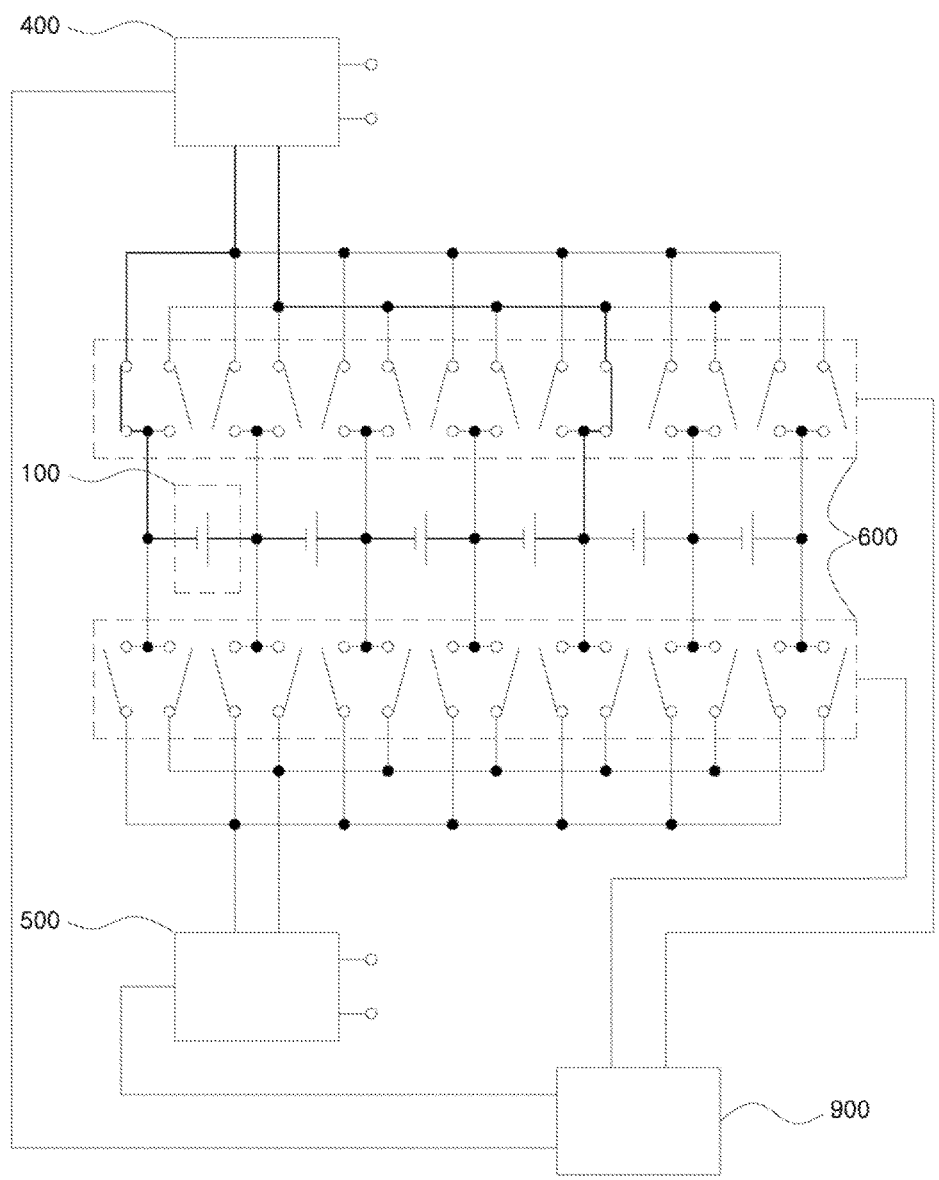
FIG. 8 is a circuit diagram illustrating an example of the redox flow battery according to the exemplary embodiment of the present invention in which only specific cells are charged.
Figure 9:
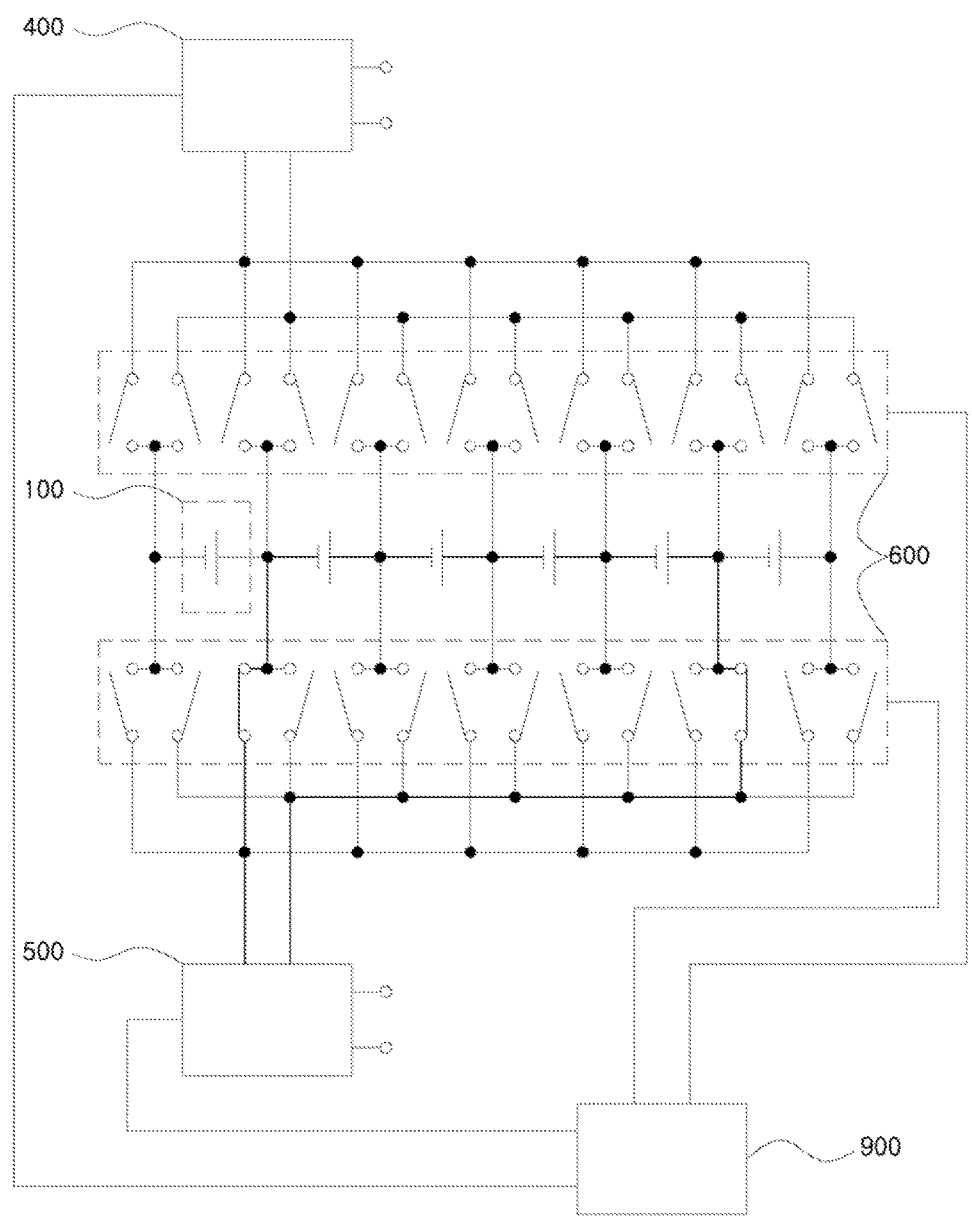
FIG. 9 is a circuit diagram illustrating an example of the redox flow battery according to the exemplary embodiment of the present invention in which only specific cells are discharged.
Figure 10:
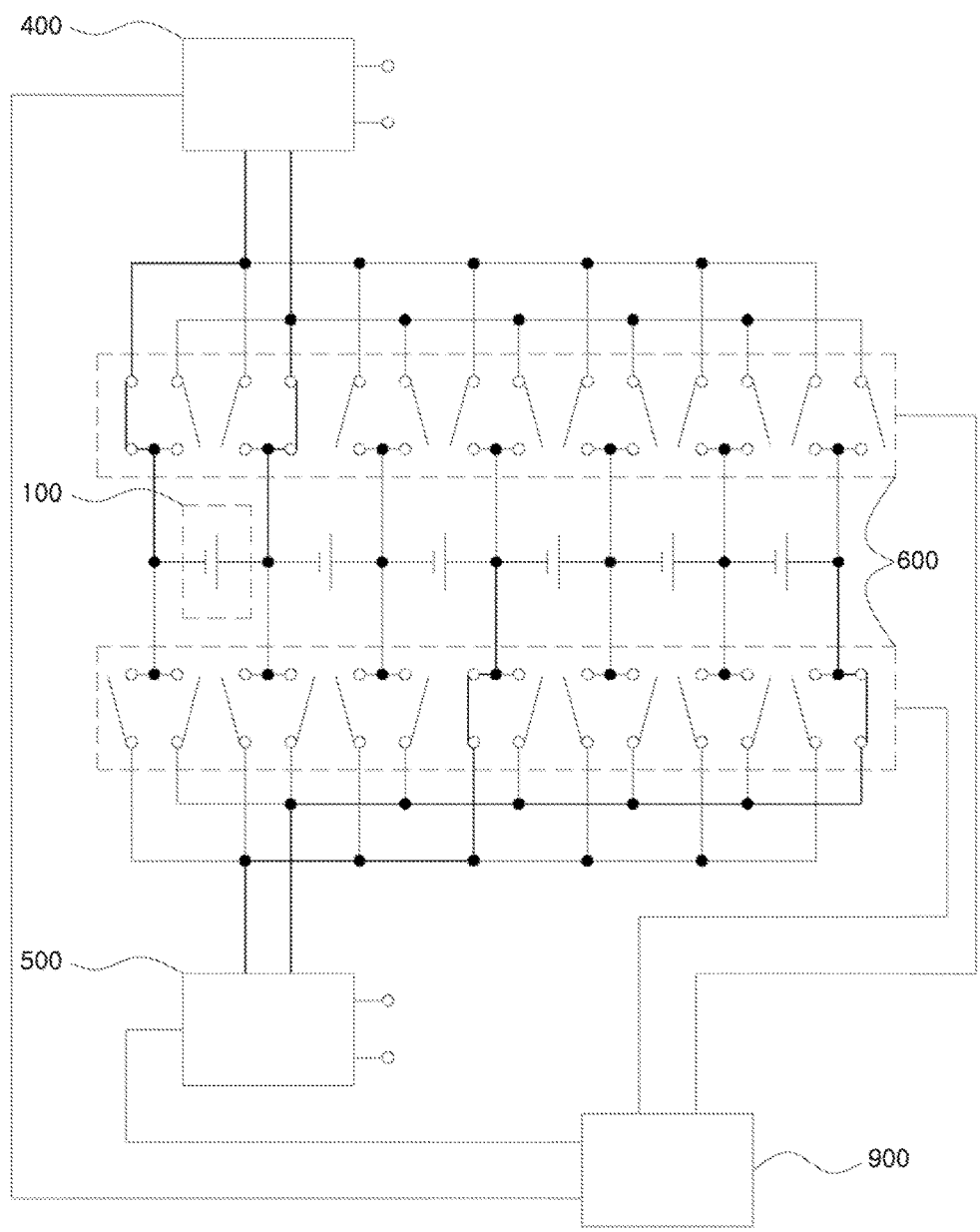
FIG. 10 is a circuit diagram illustrating an example of the redox flow battery according to the exemplary embodiment of the present invention in which specific cells are connected to the charging circuit to be charged and other specific cells are connected to the discharging circuit to be discharged.

FIG. 1 is a conceptual view illustrating a redox flow battery according to an exemplary embodiment of the present invention; FIG. 2 is a conceptual view illustrating paths along which a positive-pole electrolyte and a negative-pole electrolyte circulate in the redox flow battery according to the exemplary embodiment of the present invention; FIG. 3 is an exploded perspective view illustrating the components of the cell of the redox flow battery according to the exemplary embodiment of the present invention; FIG. 4 is an exploded perspective view illustrating an assembly in which impregnation members are added to the structure illustrated in FIG. 3; FIG. 5 is an assembly view illustrating an example in which outermost cells are attached to fixed frames in the redox flow battery according to the exemplary embodiment of the present invention; FIG. 6 is a flow diagram illustrating the redox flow battery according to the exemplary embodiment of the present invention; FIG. 7 is a circuit diagram illustrating an example of the redox flow battery according to the exemplary embodiment of the present invention in which a plurality of switches are provided such that the electrical connection between the cells is selectively embodied using series connection, parallel connection, or series-and-parallel combined connection; FIG. 8 is a circuit diagram illustrating an example of the redox flow battery according to the exemplary embodiment of the present invention in which only specific cells are charged; FIG. 9 is a circuit diagram illustrating an example of the redox flow battery according to the exemplary embodiment of the present invention in which only specific cells are discharged; and FIG. 10 is a circuit diagram illustrating an example of the redox flow battery according to the exemplary embodiment of the present invention in which specific cells are connected to the charging circuit to be charged and other specific cells are connected to the discharging circuit to be discharged.

Referring to FIGS. 1 to 6, the redox flow battery according to the exemplary embodiment of the present invention has electrolyte solutions stored in a tank thereof and circulates the electrolyte solutions through the inside of cells (see FIG. 1). The redox flow battery includes a single cell 100 or a plurality of cells 100 (see FIG. 3). Each of the cells 100 includes a separator membrane 110, path frames 120a and 120b, and separator plates 130a and 130b. The redox flow battery includes three or more collector plates 200a, 200b, and 200c formed of a conductive material and stacked on the outer surfaces of both the outermost cells among the plurality of cells 100 and between two adjacent cells among the plurality of cells 100. A first circulation path extends through a fixed frame 300a disposed on one side of the stack of the cells 100 and the path frame 120a and returns to the fixed frame 300a, such that a positive-pole electrolyte enters through the fixed frame 300a, flows through the path frame 120a, and exits through the fixed frame 300a. A second circulation path extends through a fixed frame 300b disposed on the other side of the stack of the cells 100 and the path frame 120b and returns to the fixed frame 300b, such that a negative-pole electrolyte enters through the fixed frame 300b, flows through the path frame 120b, and exits through the fixed frame 300b. As illustrated in FIG. 6, the redox flow battery further includes a charging circuit 400, a discharging circuit 500, a switching circuit 600, and a controller 900.

As illustrated in FIG. 2, the paths of the redox flow battery according to the exemplary embodiment of the present invention are configured such that the positive-pole electrolyte circulates through a positive-pole electrolyte path and the negative-pole electrolyte circulates through a negative-pole electrolyte path. Thus, the positive-pole electrolyte and the negative-pole electrolyte do not mix with each other, so that the positive-pole electrolyte circulates only through the positive-pole electrolyte path and the negative-pole electrolyte circulates only through the negative-pole electrolyte path.

Hereinafter, in the unit cell having the structure illustrated in FIG. 3, the separator plate 130a disposed on the right side of the cell will be referred to as a positive pole side, and the separator 130b disposed on the left side of the cell will be referred to as a negative pole side.

The positive-pole electrolyte enters the inside of the positive pole-side path frame 120a through an inlet-side path of the positive pole-side path frame 120a from a portion of the positive-pole electrolyte path (i.e. the lower path in FIG. 2). Afterwards, the positive-pole electrolyte that has entered the inside of the positive pole-side path frame 120a exits to a portion of the positive-pole electrolyte path (i.e. the upper path in FIG. 2) through an outlet-side path of the positive pole-side path frame 120a. Here, referring to FIG. 3, the inlet-side path and the outlet-side path are formed in one corner and the other corner.

The negative-pole electrolyte enters the inside of the negative pole-side path frame 120b through an inlet-side path of the negative pole-side path frame 120b from a portion of the negative-pole electrolyte path (i.e. the lower path in FIG. 2). Afterwards, the negative-pole electrolyte that has entered the inside of the negative pole-side path frame 120b exits to a portion of the negative-pole electrolyte path (i.e. the upper path in FIG. 2) through an outlet-side path of the negative pole-side path frame 120b. Here, referring to FIG. 3, the inlet-side path and the outlet-side path are formed in one corner and the other corner.

Although the outlet-side path and the inlet-side path of the positive pole-side path frame 120a are illustrated in FIG. 3 as being staggered to the outlet-side path and the inlet-side path of the negative pole-side path frame 120b such that the outlet-side path and the inlet-side path of the positive pole-side path frame 120a do not oppose the outlet-side path and the inlet-side path of the negative pole-side path frame 120b, the present invention is not limited thereto. Since the separator membrane 110 prevents the positive-pole electrolyte and the negative-pole electrolyte from mixing with each other, a variety of paths may be formed.

As described above, the positive-pole electrolyte circulates through the positive-pole electrolyte path, while the negative-pole electrolyte circulates through the negative-pole electrolyte path. The positive-pole electrolyte that has entered the positive-pole electrolyte-side path frame 120a and the negative-pole electrolyte that has entered the negative-pole electrolyte-side path frame 120b carry out oxidation and reduction, whereby charging and discharging are enabled.

The separator plate 130a, the flow frame 120a, the separator membrane 110, the flow frame 120b, and the separator plate 130b are stacked on one another, sequentially from one side, thereby foaming a single cell. A plurality of cells respectively having this structure is stacked, with at least one section having the collector plate 200c situated between the adjacent cells, and the collector plates 200a and 200b being stacked on the outer surfaces of the outermost cells, thereby forming a modular cell. A plurality of modular cells is connected to each other, thereby forming a cell stack.

The separator membrane 110 is in the shape of a membrane that allows ions transferred to both surfaces thereof from the positive-pole electrolyte and the negative-pole electrolyte to pass therethrough.

The separator membrane 110 is also referred to as a membrane. Ion exchange is performed between the positive-pole electrolyte circulating on one side of the separator membrane 110 and the negative-pole electrolyte circulating on the other side of the separator membrane 110. Here, the separator membrane 110 allows ions to pass therethrough. That is, the separator membrane 110 disposed in the center allows ions to be exchanged without the mixture of the positive-pole electrolyte and the negative-pole electrolyte.

Electrons created in this process flow through the collector plates 200a, 200b, and 200c, as will be described later, whereby charge and discharge are enabled. The flow battery as described above is known to be most suitable for an energy storage system, since the longevity thereof is longer than that of conventional secondary batteries and the flow battery can be fabricated into a medium or large system having a capacity of kWs to MWs.

The path frames 120a and 120b are formed on both sides of the separator membrane 110, such that the paths through which the positive-pole electrolyte and the negative-pole electrolyte pass are foamed.

The path frames 120a and 120b respectively have an open area formed in the inner portion and the paths formed in the outer portion, one of the path frames 120a and 120b being stacked on the positive pole side and the other of the path frames 120a and 120b being stacked on the negative pole side.

Each of the paths of the path frames 120a and 120b includes the inlet-side path through which an electrolyte solution enters and the outlet-side path through which the electrolyte solution exits.

That is, an electrolyte solution introduced through each of the path frames 120a and 120b exits through the corresponding path frame 120a or 120b.

Specifically, the positive-pole electrolyte enters through the inlet-side path of the path frame 120a stacked on the positive pole side and exits through the outlet-side path of the path frame 120a. In addition, the negative-pole electrolyte enters through the inlet-side path of the path frame 120b stacked on the negative pole side and exits through the outlet-side path of the path frame 120b.

The separator plates 130a and 130b are stacked on the outer surfaces of the path frames 120a and 120b and allow electric charges to pass therethrough.

One of the separator plates 130a and 130b is stacked on the positive pole side, and the other of the separator plates 130a and 130b is stacked on the negative pole side.

The separator membrane 110, the path frames 120a and 120b, and the separator plates 130a and 130b foam spaces having predetermined areas to prevent electrolyte solutions from leaking to any other portions except for the predetermined paths.

Here, the separator plates 130a and 130b allow electrons to pass therethrough. That is, this configuration allows electrons to migrate while preventing electrolyte solutions to leak to any other portions except for the predetermined paths.

That is, ions from electrolyte solutions that have entered the spaces defined by the separator membrane 110, the path frames 120a and 120b, and the separator plates 130a and 130b pass through the separator film 110, and electrons pass through the separator plates 130a and 130b to move through the collector plates 200a and 200b that will be described later.

In addition, impregnation members 160 (see FIG. 4) are provided in the spaces defined by stacking the separator membrane 110, the path frames 120a and 120b, and the separator plates 130a and 130b. The impregnation members 160 are located in the spaces defined by stacking the separator membrane 110, the path frames 120a and 120b, and the separator plates 130a and 130b.

The collector plates 200a, 200b, and 200c are stacked on the outer surfaces of the outermost cells 100 and between the adjacent cells 100, are formed of a conductive material, and are comprised of three or more collector plates. In the collector plates 200a, 200b, and 200c, the collector plates 200a and 200b are stacked on the positive electrode sides of the outermost cells, and there is at least one section having the collector plate 200c situated between the adjacent cells. That is, at least one collector plate 200c is disposed between the adjacent cells. In addition to the above-described case in which a collector plate is provided between every cell and an adjacent cell, collector plates may be provided to be respectively located between adjacent cells among two or more cells and the cells located between the collector plates may be connected via separator plates.

The collector plates 200a, 200b, and 200c are formed of a conductive material. Each of the collector plates 200a, 200b, and 200c may be electrically connected to the remaining collector plates.

The charging circuit 400 provides charging power to the cells 100.

The charging circuit 400 serves to provide charging power to the cells 100. The charging circuit 400 charges the cells 100 with power supplied from an external source.

The discharging circuit 500 provides discharging power from the cells 100 to an external load.

The discharging circuit 500 serves to provide power supplied from the cells 100 to the external load. The discharging circuit 500 applies (i.e. discharges) power generated by the cells 100 to the external load.

The switching circuit 600 switches the electrical connection between the cells 100 and the charging circuit 400 and the electrical connection between the cells 100 and the discharging circuit 500.

The switching circuit 600 switches the electrical connection between the connector terminals of the collector plates 200a, 200b, and 200c and the charging circuit 400 and the electrical connection between the connector terminals of the collector plates 200a, 200b, and 200c and the discharging circuit 500.

That is, the switching circuit 600 performs switching such that a portion or all of the cells 100 are charged, discharged, or charged and discharged.

The controller 900 controls the switching circuit 600 by discriminating at least one cell among the plurality of cells 100 that is used in the charging operation and the remaining cell(s) that is used in the discharging operation.

The controller 900 controls the switching circuit 600 such that the redox flow battery according to the exemplary embodiment of the present invention is charged, discharged, or charged and discharged.

As illustrated in FIG. 7, the switching circuit 600 of the redox flow battery according to the exemplary embodiment of the present invention includes a plurality of switches, such that the electrical connection between the cells 100 is selectively embodied using series connection, parallel connection, or series-and-parallel combined connection.

For example, in the case in which an assembly of the cells 100 is referred to as a modular cell and an assembly of modular cells is referred to as a cell stack, the cells 100 of the modular cell can be connected in a series structure, a parallel structure, or a series-and-parallel mixed structure, and the modular cells of the cell stack can be connected in a series structure, a parallel structure, or a series-and-parallel mixed structure. In addition, a plurality of such cell stacks can be connected in a series structure, a parallel structure, or a series-and-parallel mixed structure.

FIG. 7 illustrates an example in which six cells 100 are put together to form a single modular cell. With reference to the example illustrated in FIG. 7, the electrical connection between the cells 100 will be described.

Performing the switching operation such that all of the cells 100 illustrated in FIG. 7 are connected in series can raise the voltage of a single modular cell to the highest level. That is, when a relatively high voltage is required by a load, the switching operation can be performed such that the cells 100 are connected in series to provide the required level of voltage.

When the switching operation is performed such that all of the cells 100 illustrated in FIG. 7 are electrically connected in parallel, the amount of electricity generated by a single modular cell can be maximized. That is, when a large amount of current is required by the load, the switching operation can be performed such that the cells 100 are connected in parallel to provide the required amount of current.

Thus, the switching operation can be performed such that the electrical connection between the cells 100 is enabled as series-and-parallel combined connection, depending on the level of voltage and the amount of current required by the load. For example, a level of voltage generated by two cells connected in series is required by a load, cell groups respectively formed by connecting two cells in series are connected in parallel.

As illustrated in FIGS. 8 to 10, the controller 900 of the redox flow battery according to the exemplary embodiment of the present invention controls the switching circuit 600 so that a cell connected to the charging circuit is different from a cell connected to the discharging circuit.

FIG. 8 is a circuit diagram illustrating an example of the redox flow battery according to the exemplary embodiment of the present invention in which only specific cells, i.e. first four cells to the left, are charged.

It is possible to selectively charge specific cells instead of charging all of the cells. For example, when the number of cells connected in series able to optimize the efficiency of charging a voltage applied through the charging circuit 400 is four, the circuit illustrated in FIG. 8 can be formed.

Here, although the number of cells used in the charging operation is four, the redox flow battery having shared electrolyte solutions can be charged. It is undesirable to increase the number of cells connected in series, since the increased number of cells may lower the efficiency of charging or obstruct charging.

That is, even in the case in which a level of voltage able to charge only a single cell is applied to the redox flow battery, the single cell can be connected to the charging circuit 400 due to sharing of electrolyte solutions, so that all of the cells can be charged. Thus, when a low level of voltage insufficient to charge all of the cells is applied to the charging circuit 400, it is possible to charge specific cells by connecting the cells to the charging circuit 400. Since electrolyte solutions charged in the specific cells charges the redox flow battery while circulating, the efficiency of charging can be improved.

FIG. 9 is a circuit diagram illustrating an example of the redox flow battery according to the exemplary embodiment of the present invention in which only specific cells, e.g. four cells including second to fifth cells to the left, are discharged.

It is possible to selectively discharge specific cells instead of discharging all of the cells. For example, when the number of cells connected in series to correspond to a voltage required by a load through the discharging circuit 500 is 4, the circuit illustrated in FIG. 9 can be formed.

Here, although the number of cells used in the discharging operation is four, the redox flow battery having shared electrolyte solutions can be discharged. It is undesirable to vary the number of cells connected in series, since an electrical problem (i.e. relatively lower voltage or overvoltage) on a load side may be caused thereby.

As illustrated in FIG. 10, the redox flow battery according to the exemplary embodiment of the present invention is able to be simultaneously charged and discharged.

FIG. 10 is a circuit diagram illustrating an example of the redox flow battery according to the exemplary embodiment of the present invention in which specific cells are connected to the charging circuit to be charged and specific other cells are connected to the discharging circuit to be discharged. For example, a first cell to the left is charged, while three cells including from fourth to sixth cells to the left are discharged.

That is, specific cells can be charged while the remaining cells are being discharged.

In other words, both a charging operation and a discharging operation can be simultaneously performed.

In addition, it is possible to switch a charge voltage and a discharge voltage to be different from each other.

This is substantially impossible in conventional secondary batteries in which electrolyte solutions are not shared between cells, since the lifespans of batteries are reduced due to the unbalanced state of charge (SOC) between cells.

In contrast, the redox flow battery according to the exemplary embodiment of the present invention can not only be simultaneously charged and discharged but also switch a charge voltage and a discharge voltage to be different from each other.

The controller 900 of the redox flow battery according to the exemplary embodiment of the present invention controls the switching circuit 600 based on charging electric power supplied through the charging circuit 400.

For example, the electrical connection between the connector terminals of the collector plates 200a, 200b, and 200c and the charging circuit 400 and the electrical connection between the connector terminals of the collector plates 200a, 200b, and 200c and the discharging circuit 500 can be switched, depending on a DC voltage (charging electric power) applied through an inverter.

For example, when the number of cells connected in series, by which the efficiency of charging using a DC voltage applied through an inverter can be improved, is 4, charging can be performed by switching as illustrated in FIG. 8. Here, when all of the cells connected in series (e.g. six cells in FIG. 6) are connected to the charging circuit, the efficiency of charging is lowered, and in severe cases, charging may be disabled.

The controller 900 of the redox flow battery according to the exemplary embodiment of the present invention controls the switching circuit 600 based on discharging electric power that is to be supplied to an external load through the discharging circuit 500.

When the number of cells connected in series corresponding to the level of power intended by a user is four, discharging can be performed by switching as illustrated in FIG. 9. Thus, the intended level of power can be set (e.g. varied) depending on the intention of a user, based on the same principle as that of FIG. 9 in which charging can be variably applied.

In addition, when the number of cells connected in series, by which the efficiency of charging using a DC voltage applied through an inverter can be improved, is 1 and the number of cells connected in series corresponding to the level of power intended by the user is 4, charging and discharging can be performed simultaneously by switching as illustrated in FIG. 10.

For example, when charging and discharging can be performed simultaneously all the time, cells may be categorized into output-dedicated cells, cells able to varying outputting and charging, and charge-dedicated cells. The output-dedicated cells may be dedicated to a power-outputting operation, while the charge-dedicated cells may be dedicated to a charging operation.

Here, the cells able to varying outputting and charging may be connected in series to the charge-dedicated cells, in accordance with the number of cells connected in series, by which the efficiency of charging using a DC voltage applied through an inverter can be improved, and may be connected in series to the output-dedicated cells when a level of output power higher than that of the output-dedicated cells is required by a load side.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A redox flow battery having electrolyte solutions stored in a tank and circulating the electrolyte solutions through insides of cells, the redox flow battery comprising:
   a cell or a stack of a plurality of cells, wherein the cell comprises:
       a separator membrane allowing ions transferred to both surfaces thereof from a positive-pole electrolyte and a negative-pole electrolyte to pass therethrough;
       first and second path frames stacked on both surfaces of the separator membrane, the first and second path frames having paths through which the positive-pole electrolyte and the negative-pole electrolyte pass, respectively; and
       separator plates stacked on outer surfaces of the path frames, the separator plates allowing electric charges to pass therethrough;
   three or more collector plates found of a conductive material and stacked on outer surfaces of outermost cells among the plurality of cells and between two adjacent cells among the plurality of cells;
   a first circulation path extending through a first fixed frame disposed on one side and the first path frame and returns to the first fixed frame, such that the positive-pole electrolyte enters through the first fixed frame, flows through the first path frame, and exits through the first fixed frame;
   a second circulation path extending through a second fixed frame disposed on the other side and the second path frame and returns to the second fixed frame, such that the negative-pole electrolyte enters through the second fixed frame, flows through the second path frame, and exits through the second fixed frame;
   a charging circuit supplying charging electric power to the cells;
   a discharging circuit providing discharging electric power from the cells to an external load;
   a switching circuit switching electrical connection between the cells and the charging circuit and electrical connection between the cells and the discharging circuit; and
   a controller controlling the switching circuit by discriminating specific cells among the cells used in charging and specific cells among the cells used in discharging.

2. The redox flow battery according to claim 1, wherein the switching circuit comprises a plurality of switches to selectively provide electrical connection between the cells using series connection, parallel connection, or series-and-parallel combined connection.

3. The redox flow battery according to claim 1, wherein the controller controls the switching circuit such that specific cells among the cells connected to the charging circuit differ from specific cells among the cells connected to the discharging circuit.

4. The redox flow battery according to claim 3, wherein the redox flow battery simultaneously provides charging and discharging.

5. The redox flow battery according to claim 1, wherein the controller controls the switching circuit based on charging electric power supplied through the charging circuit.

6. The redox flow battery according to claim 1, wherein the controller controls the switching circuit based on discharging electric power that is to be supplied to an external load through the discharging circuit.

* * * * *